United States Patent
Kubis et al.

(10) Patent No.: US 6,302,464 B1
(45) Date of Patent: Oct. 16, 2001

(54) PICKUP BED BALLAST ASSEMBLY

(76) Inventors: John V. Kubis; Shirley A. Kubis, both of 1160 Tucson St., Aurora, CO (US) 80011

( * ) Notice: Subject to any disclaimer, the term of this patent is extended or adjusted under 35 U.S.C. 154(b) by 0 days.

(21) Appl. No.: 09/663,157

(22) Filed: Sep. 15, 2000

(51) Int. Cl.[7] ................................................. B60R 27/00
(52) U.S. Cl. .......................................... 296/37.6; 280/759
(58) Field of Search ............................. 296/37.6; 280/759

(56) References Cited

U.S. PATENT DOCUMENTS

| | | |
|---|---|---|
| D. 346,991 | 5/1994 | Krieger, Jr. . |
| 3,727,971 | 4/1973 | Sisler . |
| 4,190,281 | 2/1980 | Chandler . |
| 4,705,317 * | 11/1987 | Henri .................................. 296/37.6 |
| 4,789,195 * | 12/1988 | Fletcher ............................. 296/37.6 |
| 4,796,914 | 1/1989 | Raynor . |
| 5,494,315 | 2/1996 | Heltenburg . |
| 5,657,916 | 8/1997 | Tackett . |
| 5,823,585 * | 10/1998 | Tanguay ......................... 296/37.6 X |
| 5,848,818 * | 6/2000 | Flueckinger ........................ 296/37.6 |
| 6,079,741 * | 6/2000 | Maver ............................. 296/37.6 X |

* cited by examiner

Primary Examiner—Joseph D. Pape

(57) ABSTRACT

A pickup bed ballast assembly for providing added traction while taking up a limited amount of pickup bed space. The pickup bed ballast assembly includes a pair of generally rectangular box shaped main containers and a pair of generally rectangular cover members. Each main container includes a pair of end walls, a first side wall, a second side wall and a bottom wall. Moreover, the main container forms a holding cavity that is used for holding a quantity of sand. The cover members are designed to selectively cover the holding cavities. Each main container is designed to fit over an associated wheel well in a bed of a pickup. In addition, each main container is coupled to the bed of a pickup thereby holding the main container in a static position.

1 Claim, 4 Drawing Sheets

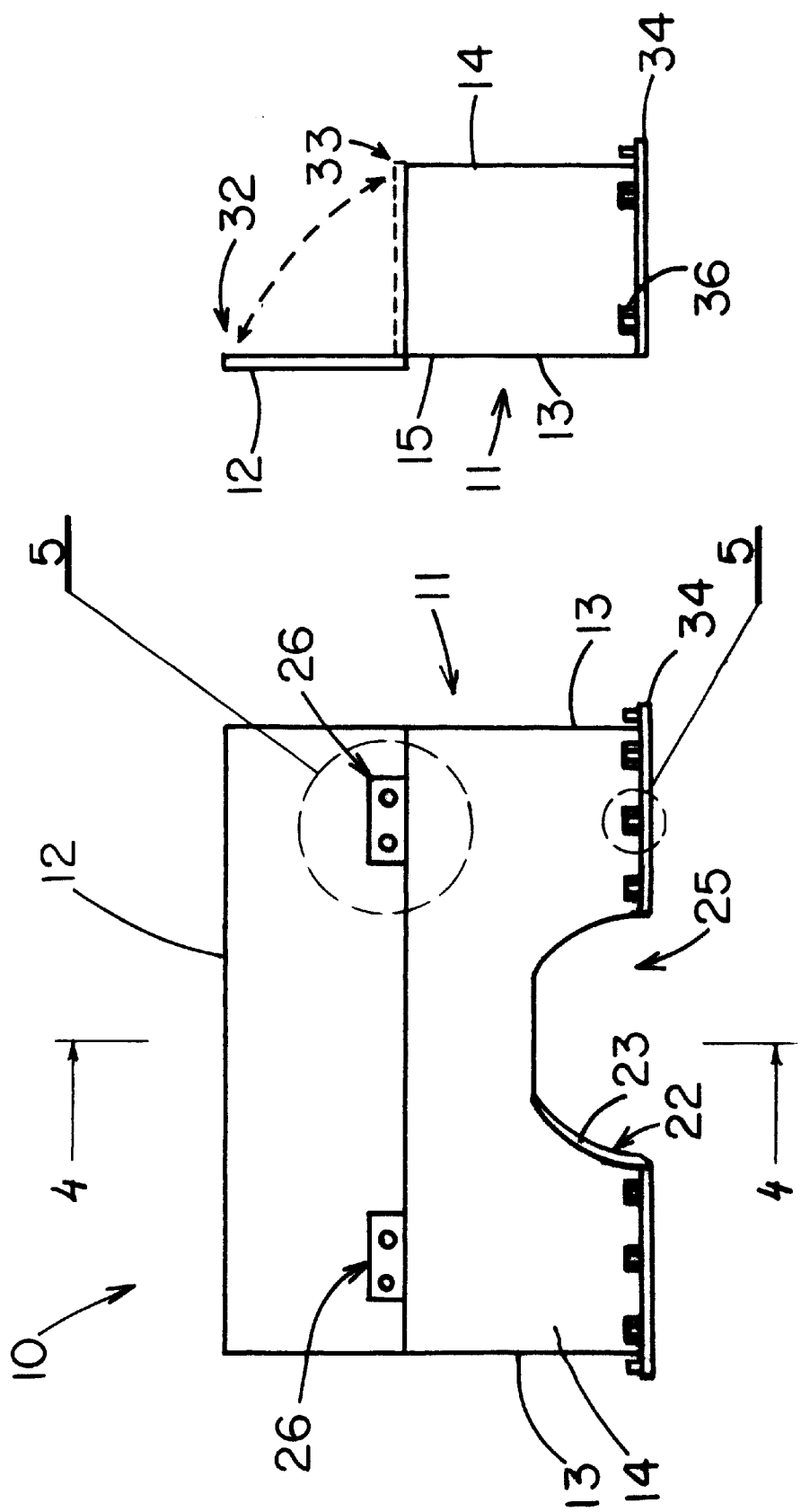

PICKUP BED BALLAST ASSEMBLY

BACKGROUND OF THE INVENTION

1. Field of the Invention

The present invention relates to ballast assemblies for pickups and more particularly pertains to a new pickup bed ballast assembly for providing added traction while taking up a limited amount of pickup bed space.

2. Description of the Prior Art

The use of ballast assemblies for pickups is known in the prior art. More specifically, ballast assemblies for pickups heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,494,315; U.S. Pat. No. 5,657,916; U.S. Pat. No. 4,190,281; U.S. Pat. No. 4,796,914; U.S. Pat. No. Des. 346,991; and U.S. Pat. No. 3,727,97 1.

While these devices fulfill their respective, particular objectives and requirements, the aforementioned patents do not disclose a new pickup bed ballast assembly. The inventive device includes a pair of generally rectangular box shaped main containers and a pair of generally rectangular cover members. Each main container includes a pair of end walls, a first side wall, a second side wall and a bottom wall. Moreover, the main container forms a holding cavity that is used for holding a quantity of sand. The cover members are designed to selectively cover the holding cavities. Each main container is designed to fit over an associated wheel well in a bed of a pickup. In addition, each main container is coupled to the bed of a pickup thereby holding the main container in a static position.

In these respects, the pickup bed ballast assembly according to the present invention substantially departs from the conventional concepts and designs of the prior art, and in so doing provides an apparatus primarily developed for the purpose of providing added traction while taking up a limited amount of pickup bed space.

SUMMARY OF THE INVENTION

In view of the foregoing disadvantages inherent in the known types of ballast assemblies for pickups now present in the prior art, the present invention provides a new pickup bed ballast assembly construction wherein the same can be utilized for providing added traction while taking up a limited amount of pickup bed space.

The general purpose of the present invention, which will be described subsequently in greater detail, is to provide a new pickup bed ballast assembly apparatus and method which has many of the advantages of the ballast assemblies for pickups mentioned heretofore and many novel features that result in a new pickup bed ballast assembly which is not anticipated, rendered obvious, suggested, or even implied by any of the prior art ballast assemblies for pickups, either alone or in any combination thereof.

To attain this, the present invention generally comprises a pair of generally rectangular box shaped main containers and a pair of generally rectangular cover members. Each main container includes a pair of end walls, a first side wall, a second side wall and a bottom wall. Moreover, the main container forms a holding cavity that is used for holding a quantity of sand. The cover members are designed to selectively cover the holding cavities. Each main container is designed to fit over an associated wheel well in a bed of a pickup. In addition, each main container is coupled to the bed of a pickup thereby holding the main container in a static position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pickup bed ballast assembly apparatus and method which has many of the advantages of the ballast assemblies for pickups mentioned heretofore and many novel features that result in a new pickup bed ballast assembly which is not anticipated, rendered obvious, suggested, or even implied by any of the prior art ballast assemblies for pickups, either alone or in any combination thereof.

It is another object of the present invention to provide a new pickup bed ballast assembly that may be easily and efficiently manufactured and marketed.

It is a further object of the present invention to provide a new pickup bed ballast assembly that is of a durable and reliable construction.

An even further object of the present invention is to provide a new pickup bed ballast assembly that is susceptible of a low cost of manufacture with regard to both materials and labor, and which accordingly is then susceptible of low prices of sale to the consuming public, thereby making such pickup bed ballast assembly economically available to the buying public.

Still yet another object of the present invention is to provide a new pickup bed ballast assembly which provides in the apparatuses and methods of the prior art some of the advantages thereof, while simultaneously overcoming some of the disadvantages normally associated therewith.

Still another object of the present invention is to provide a new pickup bed ballast assembly for providing added traction while taking up a limited amount of pickup bed space.

Yet another object of the present invention is to provide a new pickup bed ballast assembly which includes a pair of generally rectangular box shaped main containers and a pair of generally rectangular cover members. Each main container includes a pair of end walls, a first side wall, a second side wall and a bottom wall. Moreover, the main container forms a holding cavity that is used for holding a quantity of sand. The cover members are designed to selectively cover the holding cavities. Each main container is designed to fit over an associated wheel well in a bed of a pickup. In addition, each main container is coupled to the bed of a pickup thereby holding the main container in a static position.

Still yet another object of the present invention is to provide a new pickup bed ballast assembly that provides weight directly over the rear wheels of a pickup.

Even still another object of the present invention is to provide a new pickup bed ballast assembly that is easy to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic front view of the present invention.

FIG. 3 is a schematic side view of the present invention.

DESCRIPTION OF THE PREFERRED EMBODIMENT

Figure 1:
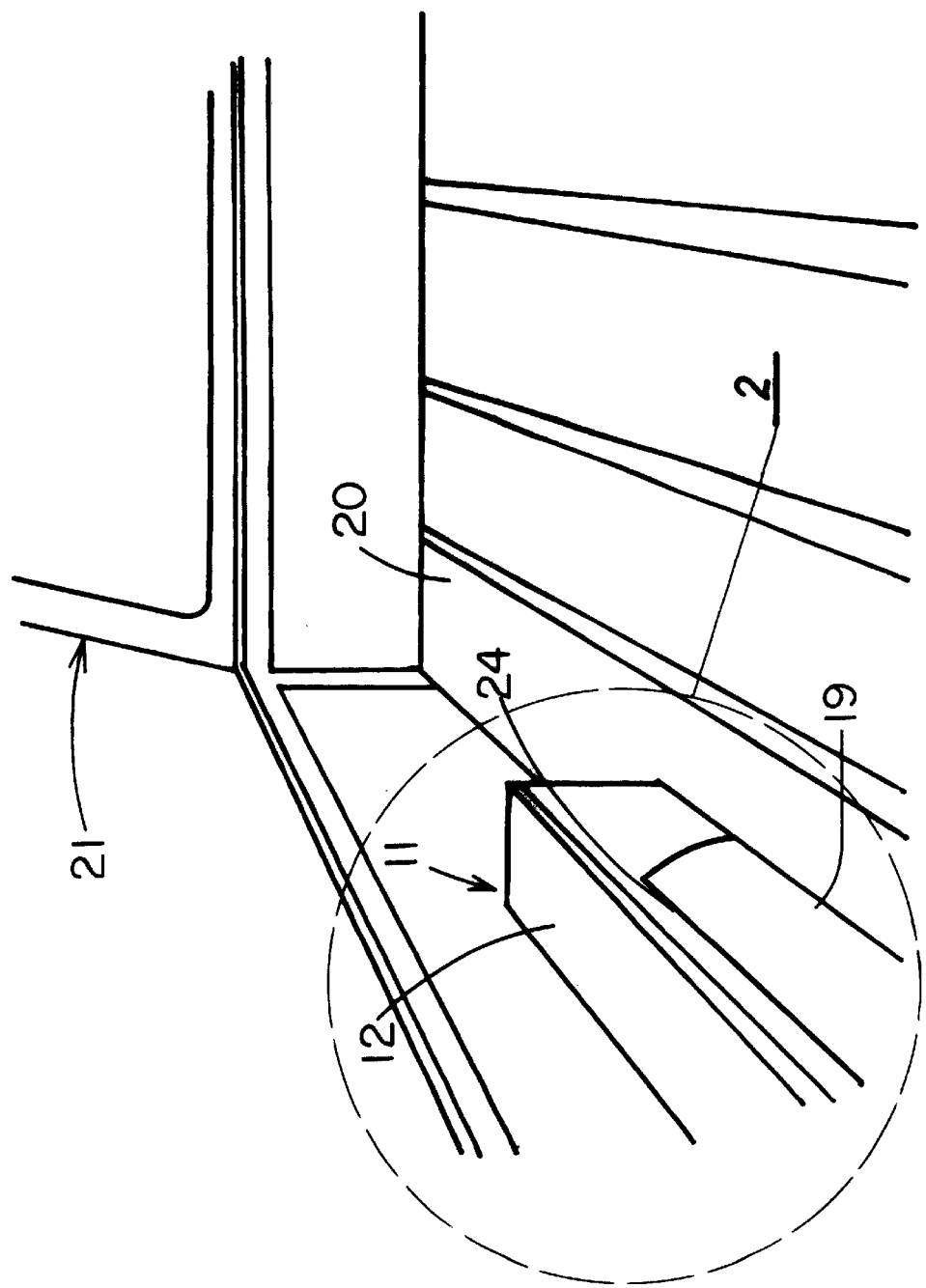
FIG. 1 is a schematic perspective view of a new pickup bed ballast assembly according to the present invention.
Figure 4:
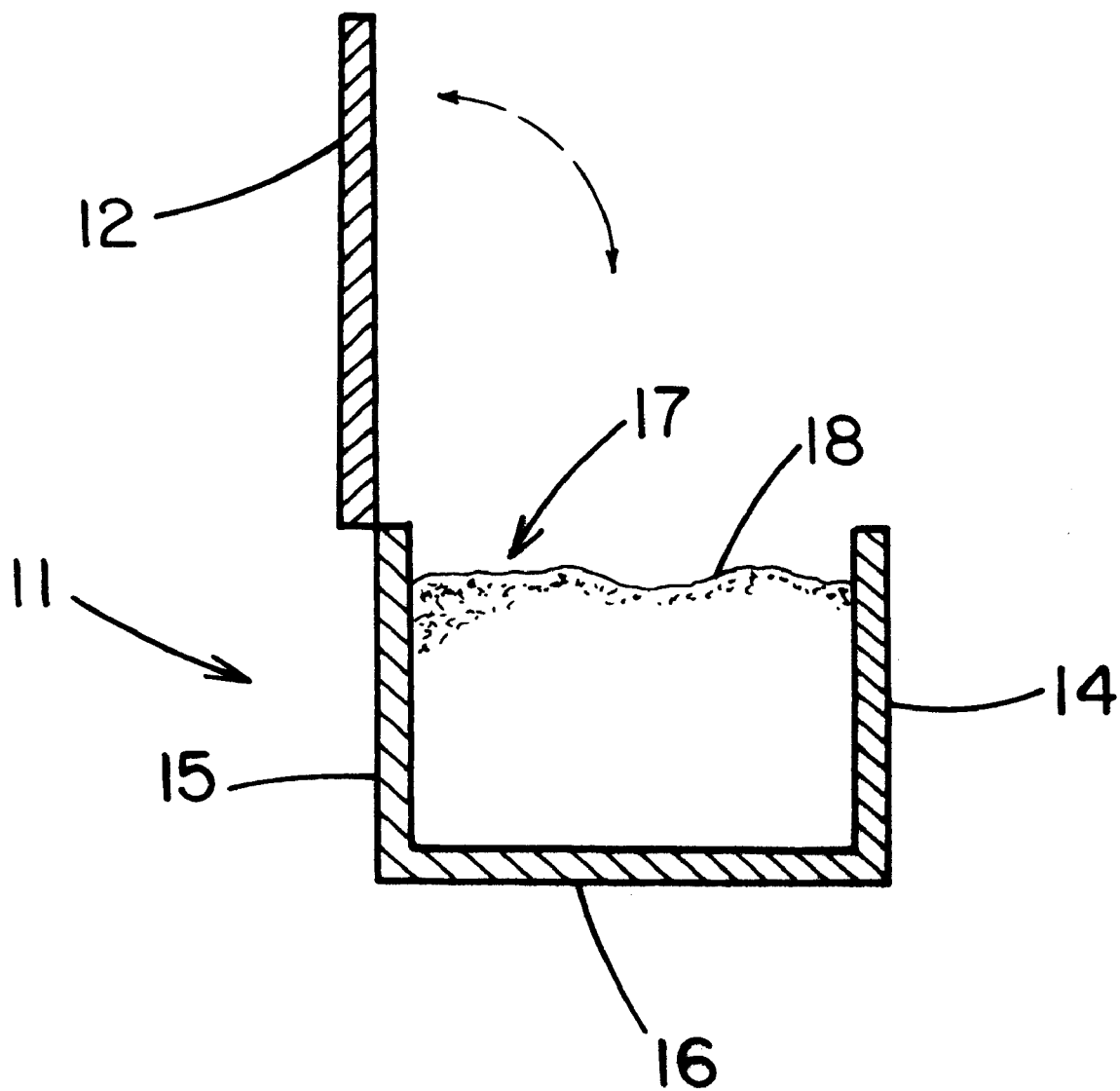
FIG. 4 is a schematic cross-sectional side view of the present invention.
Figure 5:
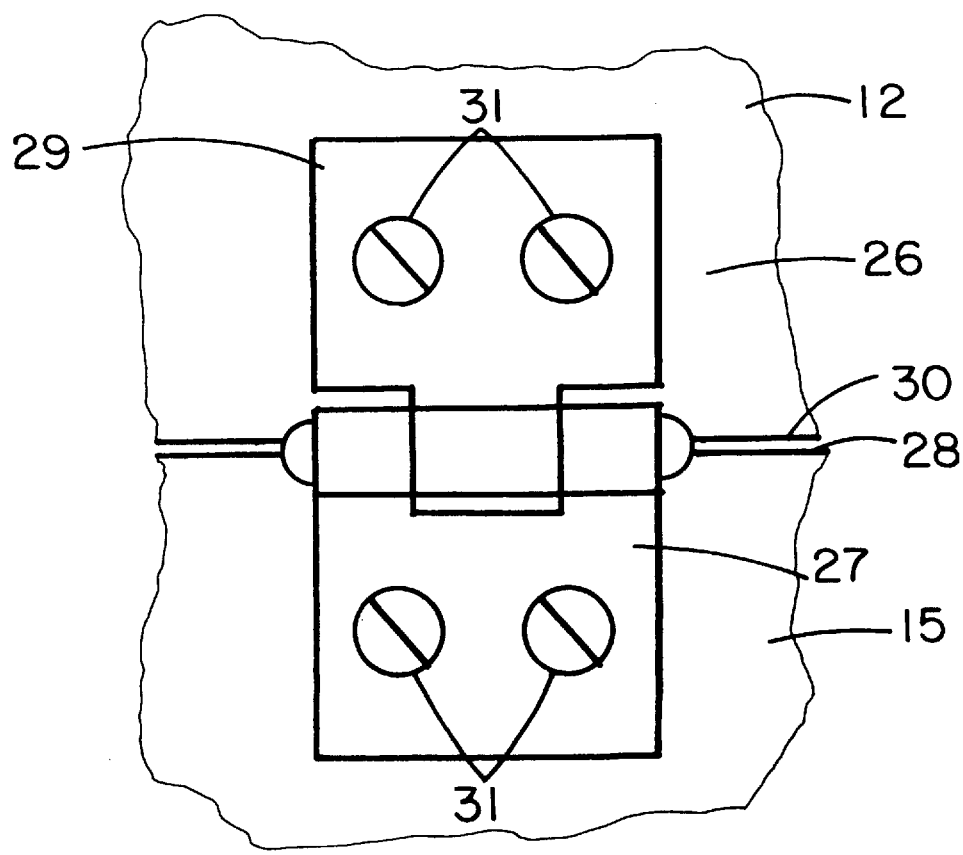
FIG. 5 is a schematic front view of a hinge of the present invention.
Figure 6:
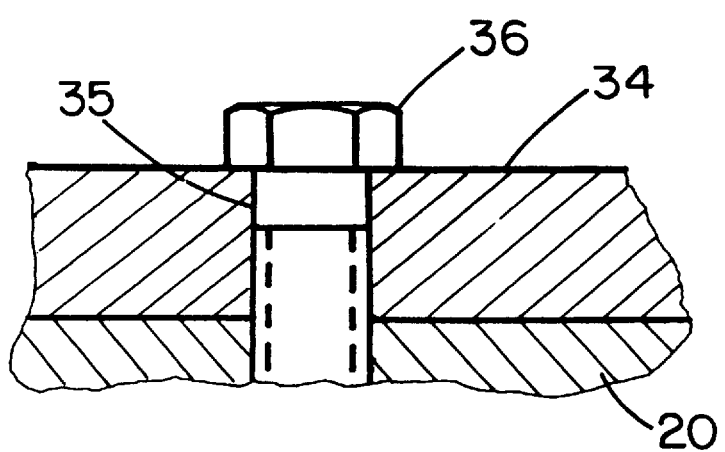
FIG. 6 is a schematic cross-sectional side view of a connecting flange of the present invention.

With reference now to the drawings, and in particular to FIGS. 1 through 6 thereof, a new pickup bed ballast assembly embodying the principles and concepts of the present invention and generally designated by the reference numeral 10 will be described.

As best illustrated in FIGS. 1 through 6, the pickup bed ballast assembly 10 generally comprises a pair of generally rectangular box shaped main containers 11 and a pair of generally rectangular cover members 12. Each main container includes a pair of end walls 13, a first side wall 14, a second side wall 15 and a bottom wall 16. Moreover, the main container 11 forms a holding cavity 17 that is used for holding a quantity of sand 18. The cover members 12 are designed to selectively cover the holding cavities 17. Each main container 11 is designed to fit over an associated wheel well 19 in a bed 20 of a pickup 21. In addition, each main container 11 is coupled to the bed 20 of the pickup 21 thereby holding the main container 11 in a static position.

In closer detail, each bottom wall 16 of the main container 11 has a wheel well depression 22. The wheel well depression 22 is shaped to fit over an associated wheel well 19. Each wheel well depression 22 has an outside surface 23 that is designed to abut an outside surface 24 of an associated wheel well 19. In addition, each first side wall 14 has a wheel well cutout portion 25. The wheel well cutout portion 25 is shaped so as to allow the first side wall 14 to fit over the wheel well 19. Moreover, each second side wall 15 also has a wheel well cutout portion 25. The wheel well cutout portion 25 is also shaped so as to allow the second side wall 15 to fit over the wheel well 19.

A plurality of hinges 26 are used to hingably couple each cover member 12 to an associated main container 11. A first portion 27 of each hinge 26 is coupled to an associated second side wall 15 proximate a top edge 28 of the second side wall 15 by a pair of screws 31. A second portion 29 of the hinge 26 is coupled to an associated cover member 12 proximate a first side edge 30 of the cover member 12 by a pair of screws 31. The hinges 26 are spaced a predetermined distance apart from each other.

Each cover member 12 has an open position 32 and a closed position 33. The open position 32 is defined when the cover member 12 is pivoted away from the holding cavity 17 of an associated main container 11. The closed position 33 is defined when the cover member 12 is positioned to obstruct the holding cavity 17 of an associated main container 11.

Connecting flanges 34 are used to couple each main container 11 to the bed 20 of the pickup 21. Each connecting flange 34 extends perpendicular from the first side wall 14 and the end walls 13 of an associated main container 11. Each connecting flange 34 is further positioned adjacent the bottom wall 16 of the holding container 11. Each connecting flange 34 has a plurality of apertures 35. The apertures 35 are spaced a predetermined distance apart from each other.

A plurality of bolts 36 are used for securing the holding containers 11 to the bed 20 of the pickup 21. The bolts 36 are designed to be received in the apertures 35 in an associated connecting flange 34. The bolts 36 secure the connecting flanges 34 to the bed 20 of the pickup 21.

In use, each holding container 11 is positioned over an associated wheel well 19 and coupled to the bed 20 of the pickup 21. Each cover member 12 is then positioned in its open position 32. A desired amount of sand 18 is then placed in each holding cavity 17. Once the desired amount of sand 18 has been placed in the holding cavities 17, the cover members 12 are positioned in their closed positions 33 and the pickup bed ballast assembly 10 is ready for use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pickup bed ballast assembly comprising:

a pair of generally rectangular box shaped main containers, each said main container including a pair of end walls, a first side wall, a second side wall and a bottom wall;

said main container forming a holding cavity for holding a quantity of sand;

a pair of cover members, said cover members being adapted for selectively covering said holding cavities;

a plurality of hinges for hingably coupling each said cover member to an associated said main container, a first portion of each said hinge being coupled to an interior surface of an associated said second side member proximate a top edge of said second side wall, a second portion of each said hinge being coupled to a bottom surface of an associated said cover member proximate a first side edge of said cover member whereby each said hinge permits opening of said cover member such that each said hinge is prevented from contacting a side wall of a pickup for preventing damage to the side wall of the pickup by each said hinge;

each said cover member having an open position and a closed position, said open position being defined when said cover member is pivoted away from said holding cavity of an associated said main container, said closed position being defined when said cover member is positioned to obstruct said holding cavity of an associated said main container;

each said main container being adapted to fit over an associated wheel well in a bed of a pickup truck;

each said bottom wall of said main container having a wheel well depression, said wheel well depression being shaped to fit over an associated wheel well;

each said wheel well depression having an outside surface adapted to abut an outside surface of an associated said wheel well;

each said first side wall having a wheel well cutout portion, said wheel well cutout portion being shaped to allow said first side wall to fit over said wheel well;

each said second side wall also having a wheel well cutout portion, said wheel well cutout portion being shaped to allow said second side wall to fit over said wheel well;

a pair of connecting flanges, each said connecting flange extending perpendicular from said first side wall and said end walls of an associated said main container, said connecting flange further being positioned adjacent said bottom wall of said main container, each said connecting flange having a plurality of apertures, said apertures being spaced a predetermined distance apart from each other; and a plurality of bolts for securing said main containers to said bed of said pickup, said bolts being adapted to be received in said apertures in an associated said connecting flange, said bolts securing said connecting flange to said bed of said pickup.

* * * * *